US 9,139,135 B2
Sep. 22, 2015

(12) United States Patent
Assaf (10) Patent No.: US 9,139,135 B2
(45) Date of Patent: Sep. 22, 2015

(54) SYSTEM AND METHOD THAT MINIMIZES HAZARDS OF BLIND SPOTS WHILE DRIVING

(76) Inventor: Musaid A. Assaf, McLean, VA (US)

( * ) Notice: Subject to any disclaimer, the term of this patent is extended or adjusted under 35 U.S.C. 154(b) by 331 days.

(21) Appl. No.: 13/606,058

(22) Filed: Sep. 7, 2012

(65) Prior Publication Data

US 2014/0071278 A1    Mar. 13, 2014

(51) Int. Cl.
| | | |
|---|---|---|
| *B60Q 1/00* | (2006.01) | |
| *B60R 1/00* | (2006.01) | |
| *G06K 9/00* | (2006.01) | |
| *B60R 1/12* | (2006.01) | |
| *H04N 7/18* | (2006.01) | |
| *B60R 1/08* | (2006.01) | |
| *G08G 1/16* | (2006.01) | |
| *B60W 50/16* | (2012.01) | |
| *B60W 50/14* | (2012.01) | |

(52) U.S. Cl.
CPC . *B60R 1/12* (2013.01); *B60R 1/081* (2013.01); *G08G 1/167* (2013.01); *B60R 2001/1253* (2013.01); *B60T 2201/082* (2013.01); *B60T 2210/34* (2013.01); *B60W 50/16* (2013.01); *B60W 2050/143* (2013.01); *B60W 2540/22* (2013.01); *B60W 2540/30* (2013.01); *H04N 7/18* (2013.01)

(58) Field of Classification Search
CPC ............. H04N 5/64; H04N 5/645; B60R 1/00
USPC ........................................... 348/148; 340/435
See application file for complete search history.

(56) References Cited

U.S. PATENT DOCUMENTS

| 5,956,181 | A | 9/1999 | Lin |
| 6,411,867 | B1* | 6/2002 | Sakiyama et al. ................. 701/1 |
| 6,859,144 | B2* | 2/2005 | Newman et al. .............. 340/576 |
| 6,882,287 | B2 | 4/2005 | Schofield |
| 7,049,945 | B2* | 5/2006 | Breed et al. ................... 340/435 |
| 7,423,521 | B2 | 9/2008 | Kukita et al. |
| 7,432,800 | B2* | 10/2008 | Harter et al. .................. 340/436 |
| 7,579,940 | B2* | 8/2009 | Schofield et al. .......... 340/425.5 |

(Continued)

FOREIGN PATENT DOCUMENTS

| JP | 2008-221980 | 9/2008 |
| JP | 4893212 | 1/2012 |

OTHER PUBLICATIONS

M.A. Sotello, J. Barriga, "Science Letters: Blind spot detection using vision for automotive applications" (Journal of Zhejiang Univ. Sci. A, 2008, pp. 1369-1372).

(Continued)

*Primary Examiner* — Dave Czekaj
*Assistant Examiner* — Alison Slater
(74) *Attorney, Agent, or Firm* — Oblon, McClelland, Maier & Neustadt, L.L.P.

(57) ABSTRACT

A blind-spot detection and collision avoidance system and method employ a blind-spot camera located between a side-view mirror and an automobile body. A rear view mirror has an integrated display that displays an indication of objects detected in blind spots. Side and rear view cameras are also included and images captured by these cameras are used to track objects as they are moved about the perimeter of the driver's automobile. Additional sensors are used to detect when the automobile is expected to change lanes so the collision avoidance system may be activated.

11 Claims, 8 Drawing Sheets

(56) References Cited

U.S. PATENT DOCUMENTS 8,044,789 B2 * 10/2011 Daura Luna et al. ......... 340/463
2008/0079553 A1 4/2008 Boice

OTHER PUBLICATIONS

Talbot, David. AT&T Reinvents the Steering Wheel. The Technology Review and Massachusetts Institute of Technology, Mar. 22, 2012. Web. May 5, 2012. <http://technologyreview.com>.

* cited by examiner

SYSTEM AND METHOD THAT MINIMIZES HAZARDS OF BLIND SPOTS WHILE DRIVING

GRANT OF NON-EXCLUSIVE RIGHT

This application was prepared with financial support from the Saudi Arabian Cultural Mission, and in consideration therefore, the present inventor has granted the Kingdom of Saudi Arabia a non-exclusive right to practice the present invention.

BACKGROUND

1. Field of the Disclosure

Embodiments described herein relate generally to a system and method for minimizing hazards of blind spots while driving. More particularly the embodiments described relate to a system and a method that can assist a driver in being made aware of other automobiles near the driver's automobile, which may not be visible in the driver's rear view and side view mirrors.

2. Description of the Background

Most automobiles are equipped with a passenger-side-view mirror, a driver-side-view mirror, and a rear-view mirror. These mirrors are used by the driver to identify vehicles that are located near the driver's automobile and assist the driver when the driver changes lanes or makes a turn. A known problem is that the mirrors do not provide complete 180 degree around the sides and back of the automobile. Areas to the immediate rear-left and rear-right of the vehicle are typically called "blind spots" that are not visible in the mirrors when the driver is seated in the driver's seat and in a driving posture. When on a multi-lane highway, the blind spots are located in the driving lane next to the automobile, usually between a car length and half a car length behind the front of the driver's automobile. It is, therefore, dangerous for the driver to change lanes by only using the mirrors.

One technique is to use a convex shaped mirror to provide a wider field of view. However, as recognized by the present inventor, the shaped mirror provides a distorted view and therefore can cause some confusion to the driver, which is especially dangerous when there is little reaction time, such as when the driver is in executing an avoidance maneuver.

The conventional technique is for the driver to turn his head and look in the blind spot. However, once again this can be dangerous since the driver has to take his eyes of the road in front of him.

JP 2008-221980 describes a camera located next to the driver's side view mirror to assist in detecting vehicles in the blind spot. However as recognized by the present inventor, this system is active all the time, and neither assists in alerting the driver when the system determines that the driver is attempting to change lanes nor assists the driver by tracking the vehicle in the blind spot.

SUMMARY

According to a blind-spot detection and collision avoidance system embodiment for an automobile, the system includes a blind-spot camera integrated into a side-view mirror assembly between a side-view mirror and a driver-side of the automobile adjacent to a driver-side window, the blind-spot camera being oriented by greater than 180° relative to the side-view mirror so as to provide a different visual operating range than the side view mirror;

a rear view mirror assembly that includes a mirrored portion and a display portion, the display portion configured to presents a visual representation of an object detected in a blind spot covered by the visual operating range of the blind-spot camera;

a tracking processor that receives an image captured by the blind-spot camera, the tracking processor including
an object detector configured to detect the object when the object is positioned within a field of view of the blind-spot camera and within a predetermined range from the blind-spot camera, and
a display processor that sends a display signal to the display portion of the rear view mirror assembly in response to the object detector determining that the object is detected to be in the blind spot, wherein
the object detector is responsive to an external signal indicating that the automobile is preparing to change driving lanes.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE EMBODIMENTS

The present inventor recognized that conventional systems do not assist a driver in inspecting a blind spot without distorting the view or requiring the driver to turn his head. In light of this deficiency, an automobile blind spot detection and tracking mechanism is presented.

Figure 1:
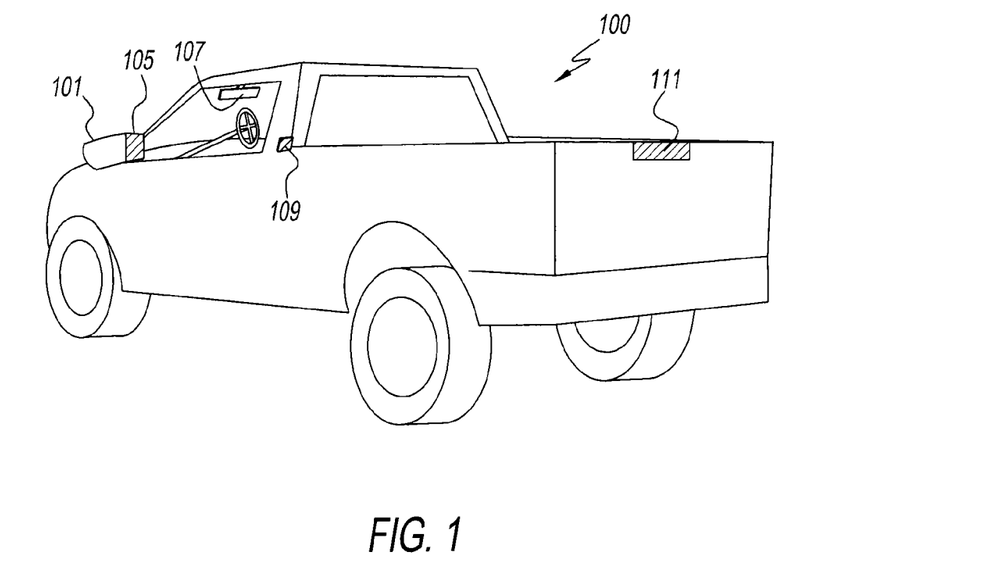
FIG. 1 is a system level view of an automobile showing a positioning of several cameras used to assist a driver in detecting vehicles in the driver's blind spot.

FIG. 1 shows an automobile 100 that includes a side view mirror 101. While the automobile 100 is shown as a pickup truck, it may also be a passenger sedan, SUV, tractor trailer, or other motorized vehicle. Integrated with the side view mirror 101 is a blind spot camera 105 (a digital video and/or digital still camera). A more detailed description of this configuration will be provided with reference to FIG. 2.

The system of FIG. 1 also includes a rear view mirror and display 107 that incorporates into a rear view mirror a display apparatus (as will be discussed in more detail with respect to FIG. 8). The display presents an indication (e.g., an illuminated LED) of a detected vehicle(s) around the automobile 100 and so the driver can easily determine if there are other vehicles in, or approaching, a blind spot, without having to turn his head and make a visual inspection.

A driver's side tracking camera 109 is a side facing camera that looks to the left of the vehicle moving forward. A similar camera is provided on the passenger side as well. These cameras may also be used to assist the driver when merging onto a highway (as opposed to driving on the highway), so the driver can look ahead when attempting to merge, yet still be aware of an approaching vehicle that has the right of way. A rear tracking camera 111 is provided near the trunk of the vehicle and faces backwards. Images detected by the cameras 105, 109 and 111 will be discussed in more detail with respect to FIG. 3.

Figure 2:
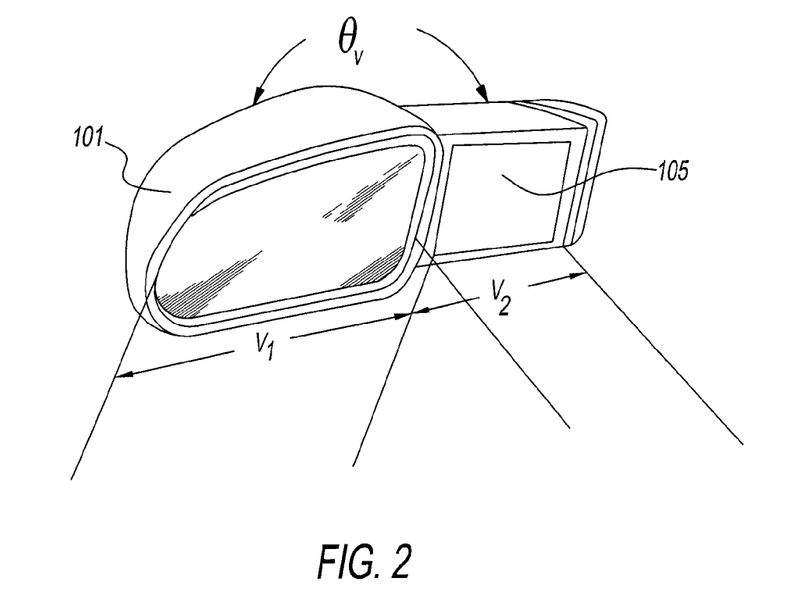
FIG. 2 is a more detailed view of a blind spot camera located between a side view mirror and the vehicle.

In FIG. 2, the side view mirror 101 is shown to be positioned adjacent to the blind spot camera 105. However, the orientation of the side view mirror 101 is shown to have a visual operating range v1 that looks rearward and to the side of the automobile 100. The blind spot camera 105 is positioned at an angle $\theta_v$ that is greater than 180° and orients the blind spot camera 105 to cover a visual range v2 that does not completely overlap that of the side view mirror 101. In particular, a blind spot which is located next to the automobile 100 is within the visual range v2 but not the visual range v1 of the side view mirror 101. It is this blind spot that is captured by the blind spot camera 105 due to the positioning of the blind spot camera with respect to the automobile and the side view mirror 101.

Figure 3:
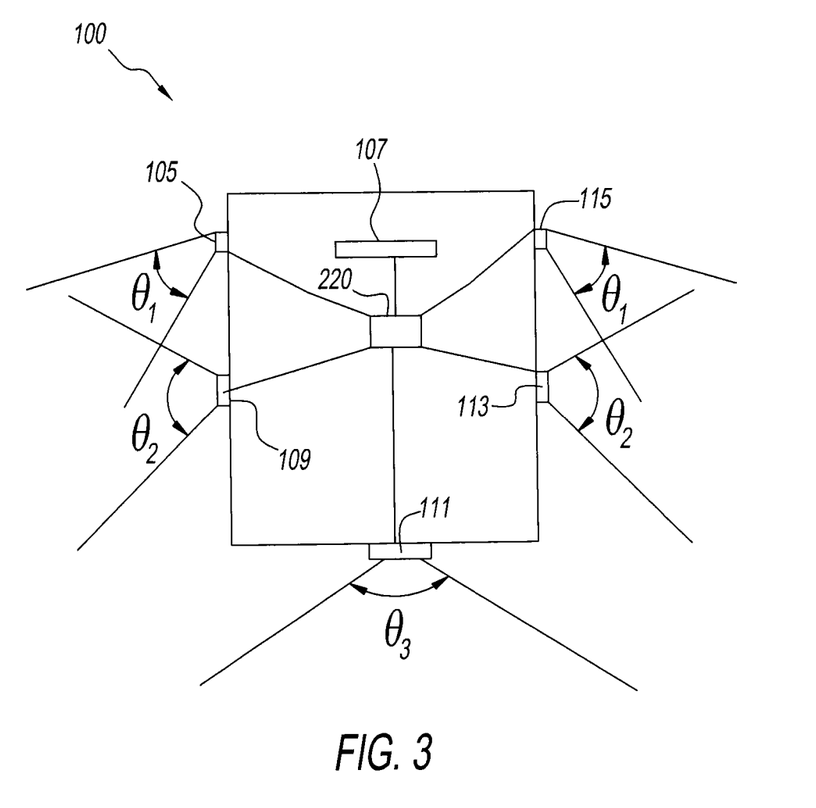
FIG. 3 is an overhead view of an automobile with respective fields of view of different cameras distributed around the vehicle.

FIG. 3 is an overhead diagram of the vehicle 100 that includes a full complement of cameras that are coordinated with a tracking processor 220. The driver-side blind spot camera 105 includes a field of view $\theta_1$. As is seen, the field of view $\theta_1$ does not provide complete coverage of the driver's side vicinity of the vehicle 100. Accordingly, a side view camera, named a driver side tracking camera 109 includes a field of view $\theta_2$ that covers a portion of the left side vicinity of the automobile 100 not covered by the field of view $\theta_1$ of the driver-side blind spot camera 105. As will be discussed, the tracking processor 220 assists in detecting another vehicle that may be in the field of view $\theta_2$ of the driver-side tracking camera 109 that is moving towards the field of view $\theta_1$ of the driver-side blind spot camera 105. Tracking the other vehicle in this manner allows for a tracking display to be presented to the user on a rear view mirror and display 107, and thus alerts the driver to approaching vehicles (when merging) or vehicles in a blind spot (when changing lanes).

FIG. 3 also shows a rear tracking camera 111 having a field of view $\theta_3$. The field of view $\theta_3$ for the rear tracking camera 111 assists the tracking processor in recognizing approaching vehicles that may not yet have been detected by the fields of view $\theta_1$ and $\theta_2$ of the cameras 105 and 109. While it is possible that the approaching vehicle may be detected visually by the side view mirror 101 (FIG. 1), the merely visual detection (as opposed to electronic detection) does not assist the tracking processor 220 in tracking or detecting another vehicle. A passenger-side tracking camera 113 has a field of view $\theta_2$ similar to that of the field of view $\theta_2$ of the driver-side tracking camera 109. Similarly, a passenger-side blind spot camera 115 has a field of view $\theta_1$ similar to that of the driver-side blind spot camera 105. In this way, the cameras 105, 115, 113, and 111 provide an opportunity to detect both approaching vehicles and other vehicles that are positioned next to the automobile 100 to be tracked and displayed on the rear view mirror and display 107 for quick and easy reference by the user while driving.

Figure 4:
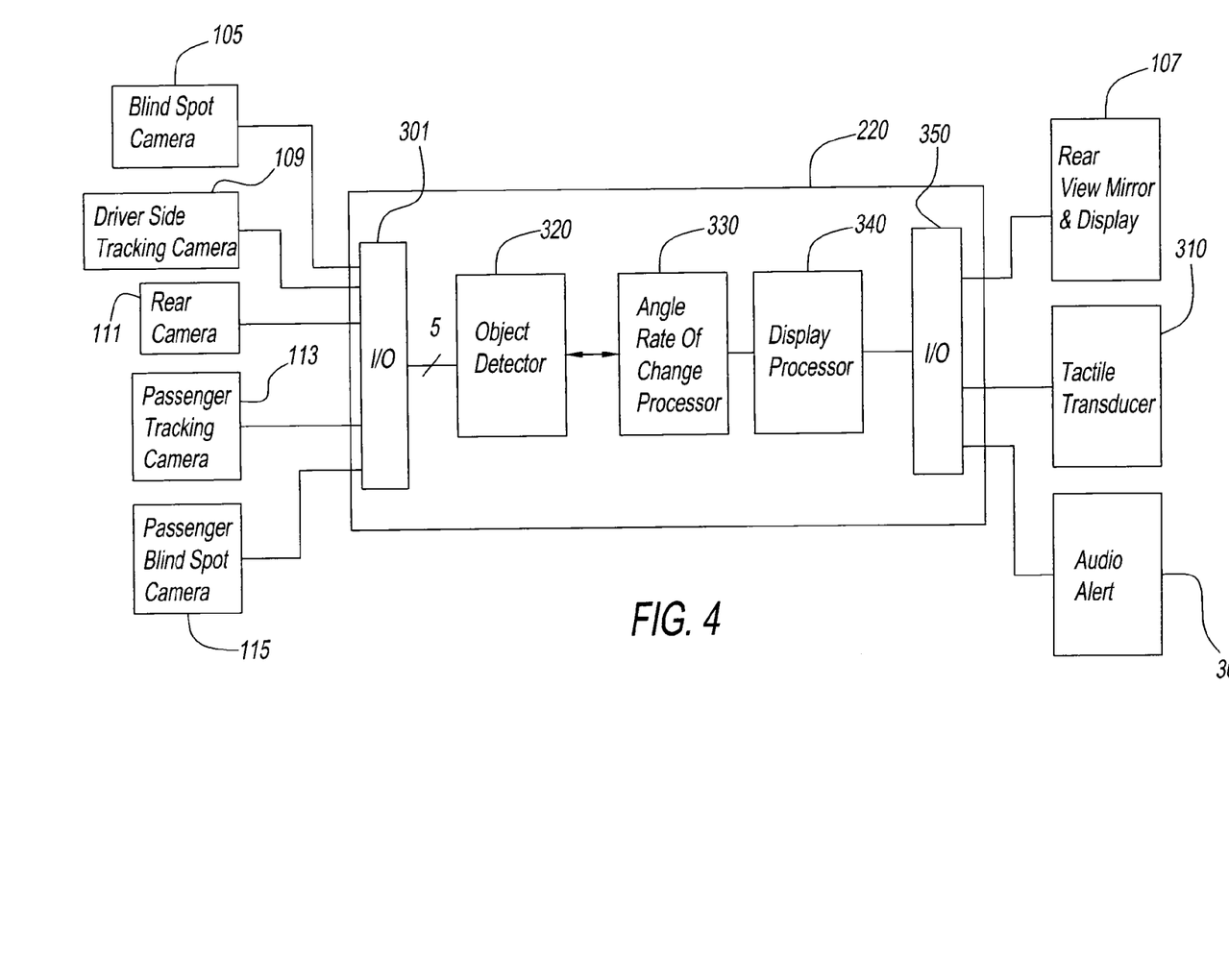
FIG. 4 is a hardware diagram showing an interconnection between cameras, processors and output devices according to an embodiment.

FIG. 4 is a block diagram showing an interconnection between the tracking processor 220 and other system components. The tracking processor 220 includes an input/output interface 301 and another input/output interface 350. The input/output interface 301 receives input from the various cameras 105, 109, 111, 113 and 115. The input/output interface 350 provides input to the rear view mirror and display 107, as well as a tactile transducer 310 and an audio alert mechanism 360.

Internal to the tracking processor 220 is an object detector 320, an angle rate of change processor 330 and a display processor 340. The object detector 320 receives input from the various cameras and identifies objects located within the respective field of views for the cameras. Once an object is detected in one of the cameras, an image is saved in memory for that detected object so that the tracking processor 320 may use that detected image to provide input to the object detector 320 when a similar object is presented within the field of view of one of the other cameras. In this way, an object is detected in the field of view of one of the cameras and may then be identified and used to "tip-off" another of the cameras in which the object may soon be presented if the object is approaching the automobile 100 or is moving around the automobile 100, perhaps from the rear of the vehicle to the side of the vehicle.

The angle rate of change processor 330 determines a rate of change in which a detected object is moving through the field of view of one of the cameras so that it may anticipate when the object will appear in the field of view of another camera. For example, in the case of the rear tracking camera 111, a vehicle that is approaching from the rear and moving at a rate of 10° per second towards the driver's side of the vehicle, may be used by the tracking processor 220 to anticipate when that other vehicle will appear in the field of view $\theta_2$ of the driver's side tracking camera 109. Moreover, the object detector 320 would begin to look for the approaching vehicle in the field of view $\theta_2$ in the driver's side tracking camera 109 within just moments of the approaching vehicle reaching the outer edge of the field of view $\theta_3$ of the rear tracking camera 111. By coordinating between cameras in this way, helps the tracking processor provide a "handoff" in terms of where and when the approaching vehicle will be displayed on the rear view mirror and display 107.

The display processor 340 prepares for display on the rear view mirror and display 107 relative positions of the detected vehicles with respect to a footprint of the automobile 100 (e.g., a rectangular box that represents an outer perimeter of the automobile 100). Moreover, the display processor 340 includes a footprint of the automobile 100 and an indication of the detected object at a representative location around the vehicle 100 based on the detected position of the detected vehicle. This way the driver may easily see in the rear view mirror and display 107 the location of the detected objects and how those detected objects move as a function of time. This allows the user to keep his head in a straight forward position while safely changing lanes by only checking the side view mirrors and rear view mirror and display 107, which can be done by quickly glancing his eyes left/right and to the rear view mirror and display 107.

Figure 5:
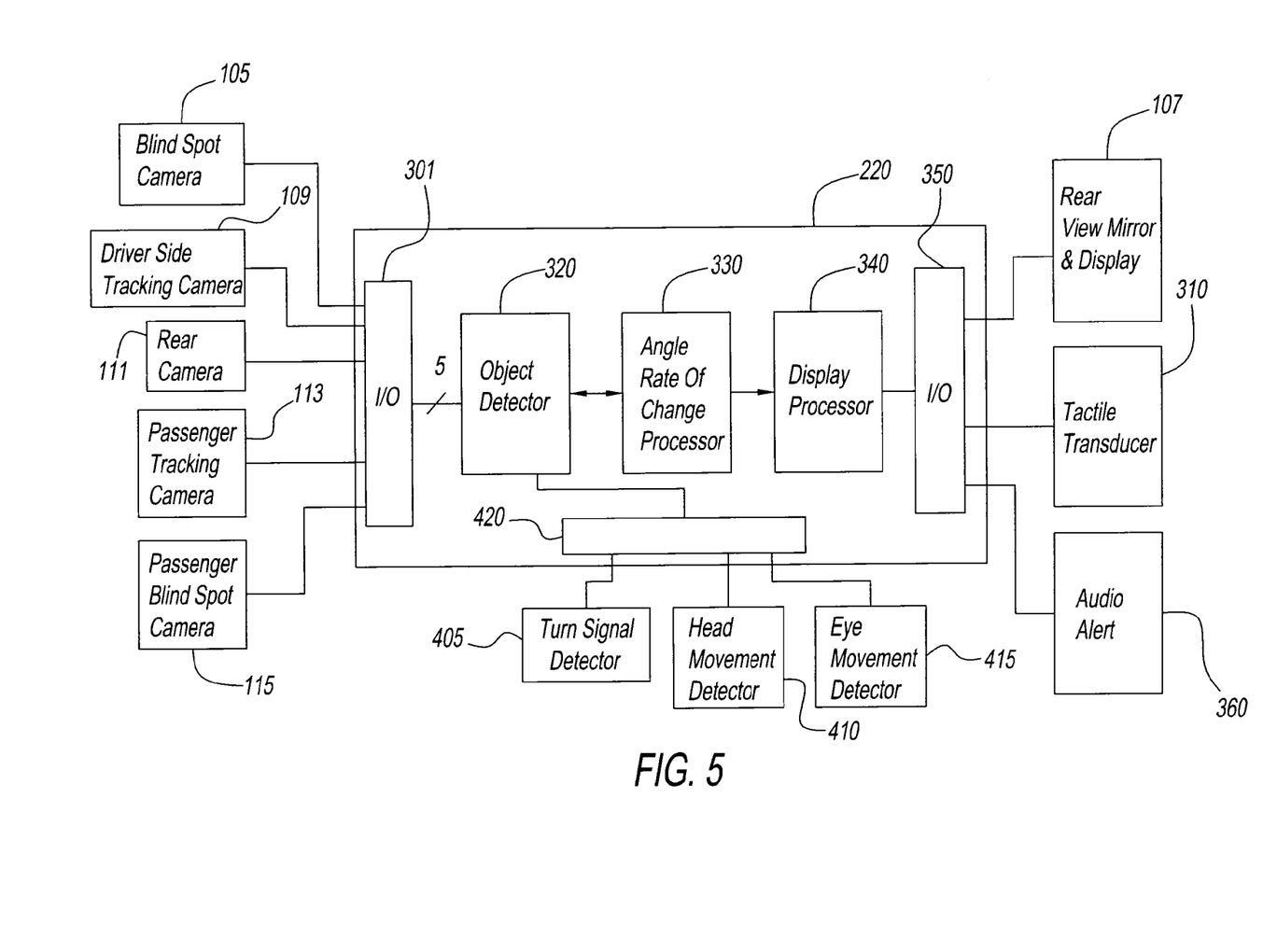
FIG. 5 is similar to FIG. 4 but includes additional sensors that determine and anticipate a possible lane change by the automobile.

A tactile transducer 310 is also connected to the input/output interface 350, and it is used to provide a tactile response to the driver if it appears that the driver is taking an action that may result in a collision with the detected object. An exemplary tactile response is a vibration of the steering wheel or perhaps a vibration of the driver's seat generated by the tactile transducer 310. The tactile transducer 310 is triggered by an electronic signal, and responds by generating a mechanical vibration. Similarly, once an audio alert 360 is triggered by an electronic signal, the audio alert 360 triggers an audio signal to drive a speaker and generate an audible alarm to alert to the driver of a potential collision. The audio alert 360 and tactile transducer 310 are user settable such that sensitivities of both devices may be set so that the number of false alarms is not overly high depending on the driver's driving pattern. The sensitivities may be set via a processor interface with options presented via a drop down command function displayed on the rear view mirror and display 107, when set in a programming mode FIG. 5 is similar to FIG. 4 although also includes three additional detectors that detect a potential movement (e.g., change of lane) of the vehicle. A turn signal detector 405 provides an input to an input/output interface 420 which in turn provides an input to the display processor 340 for generating an alert. Moreover, if the turn signal detector 450 detects that the driver has turned-on the left-hand turn signal, and the object detector 320 has recognized that an object is located in the lane in the driver's side passing lane such that if the driver chose to change lanes at that time may result in a collision, generates a signal that would cause a display processor 340 to generate a tactile response due to tactile transducer 310 and/or an audio alert through the audio alert device 360. Of course a similar detection process may be performed if the right-turn signal were turned on by the driver.

The present inventor recognized however that often drivers do not use their turn signals, but instead may look left or look right attempting to check a blind spot before turning into an adjacent lane. A head movement detector 410 (which optionally may be mounted on the visor of the driver's side) triggers an alert if the facial image of the driver is determined to have turned to the left or the right. When a trigger signal is generated and passed through the input/output 420 to the object detector 320, the object detector 320 then determines whether a potential collision may exist. If it does, then the object detector 320 generates an alert signal through the processor 340 for generating a tactile or audio alert. Similarly, a visual alert may also be generated by causing a blinking of the detected object in the display 107.

The head movement detector 310 may also include an eye movement detector 415, which may also be a separate device. The eye movement detector 410 tracks a user's eyes and generates a trigger signal when the eyes are determined to have moved far left or far right, indicating that the user is looking at adjacent lanes, perhaps signaling that the user is intending to change lanes. Similarly, if the eye movement detector 410 generates a trigger signal and there is a vehicle located in an adjacent lane in the direction in which the user is looking, the object detector 320 recognizes that a collision may occur and generates a trigger signal to the display processor 340 for generating a visual, tactile or audio alert.

Furthermore, the object detector 320 considers a size and optionally a shape of the detected object to estimate a distance between the detected object and the camera. This is so that the object detector does not generate a false detection if the detected object is a long distance from the camera. The distance may be determined either optically (by percentage of field of view occupied by the detected object) or with a supplemental distance detector, such as a laser range finder, built into the camera. With respect to percentage of field of view, it may be that one of the cameras views a portion of the detected object while another camera views another portion of the detected object. Accordingly, the object detector considers detection amounts from multiple camera sources. Table 1 shows exemplary percentages of fields of view for triggering a detection event, and Table 2 shows what conditions exist to place the object detector 320 in an active alert mode, or a standby mode. The active alert mode is one in which a warning signal will be generated, while the standby mode will not.

TABLE 1

|  | Percentage Field of view |
| --- | --- |
| Blind Spot Camera alone | 25% to 100% |
| Side tracking camera alone | 30% to 100% |
| Rear camera alone | N/A |
| Blind spot/side | Combined >45% |
| Side/rear | Combined 45% |

TABLE 2

| Turn Signal On | Alert mode |
| --- | --- |
| Turn Signal Off | Standby |
| Head Orientation 15° to 120° | Alert mode |
| Head Orientation 0° to 14° | Standby |
| Eye Movement <15° | Alert mode |
| Eye Movement >15° | Standby |

Figure 6:
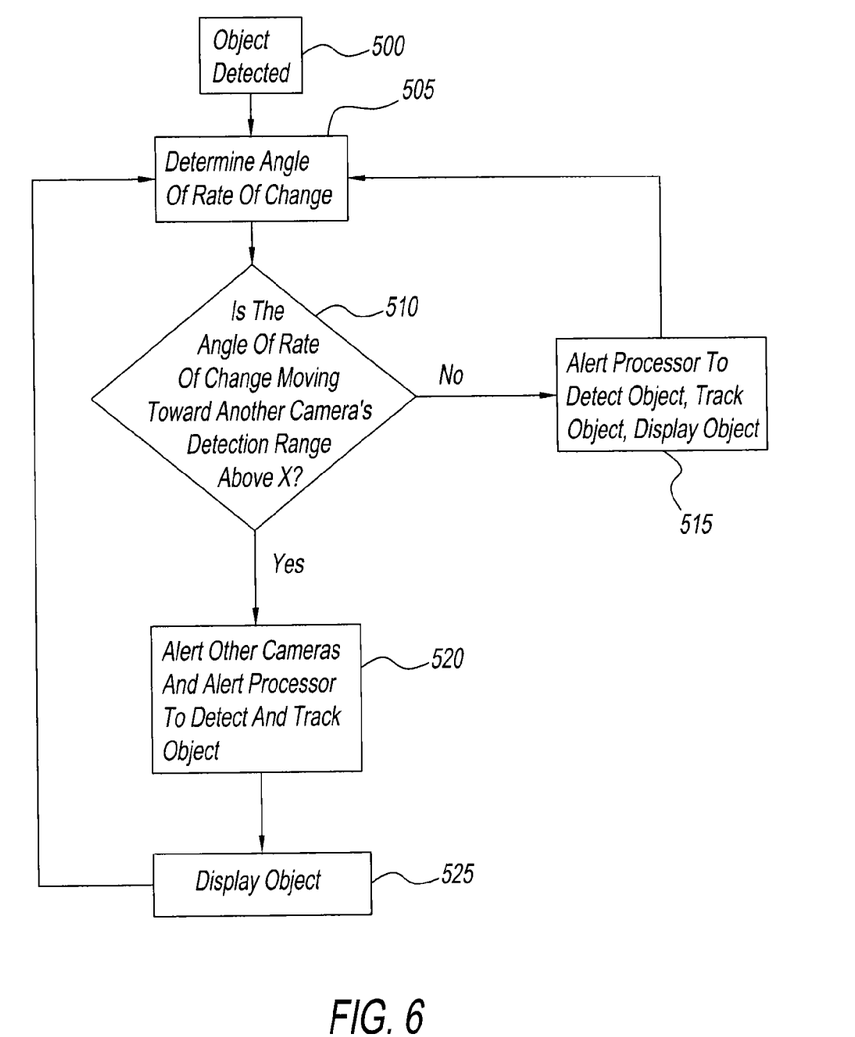
FIG. 6 is a flowchart of a method for tracking obstacles as the obstacles move between the fields of view of different cameras.

FIG. 6 is a flow diagram showing a method for coordinating between cameras. The process begins in step 500 where an object is detected. The process then proceeds to step 505 where an angle of rate of change is determined for that detected object within the field of view of that particular camera. An inquiry is then made in step 510 regarding whether the angle of rate of change moving toward another camera detection range is above a predetermined threshold (such as 10° per second, which indicates a close proximity and a rapid movement around the automobile). If the response to the query in step 510 is negative, the process proceeds to step S515 where a signal is generated to alert the tracking processor to detect the tracking object and display the object and then the process returns to step S505. However, if the response to the query in step 510 is affirmative, the process proceeds to step 520 where another camera is alerted as well as the tracking processor to detect and track the object within the field of view for that particular object. Then the object is displayed in step 525 and the process returns to step 505. The values in Table 1 are consulted to determine if the detected object is within range to trigger a recognition event.

Figure 7:
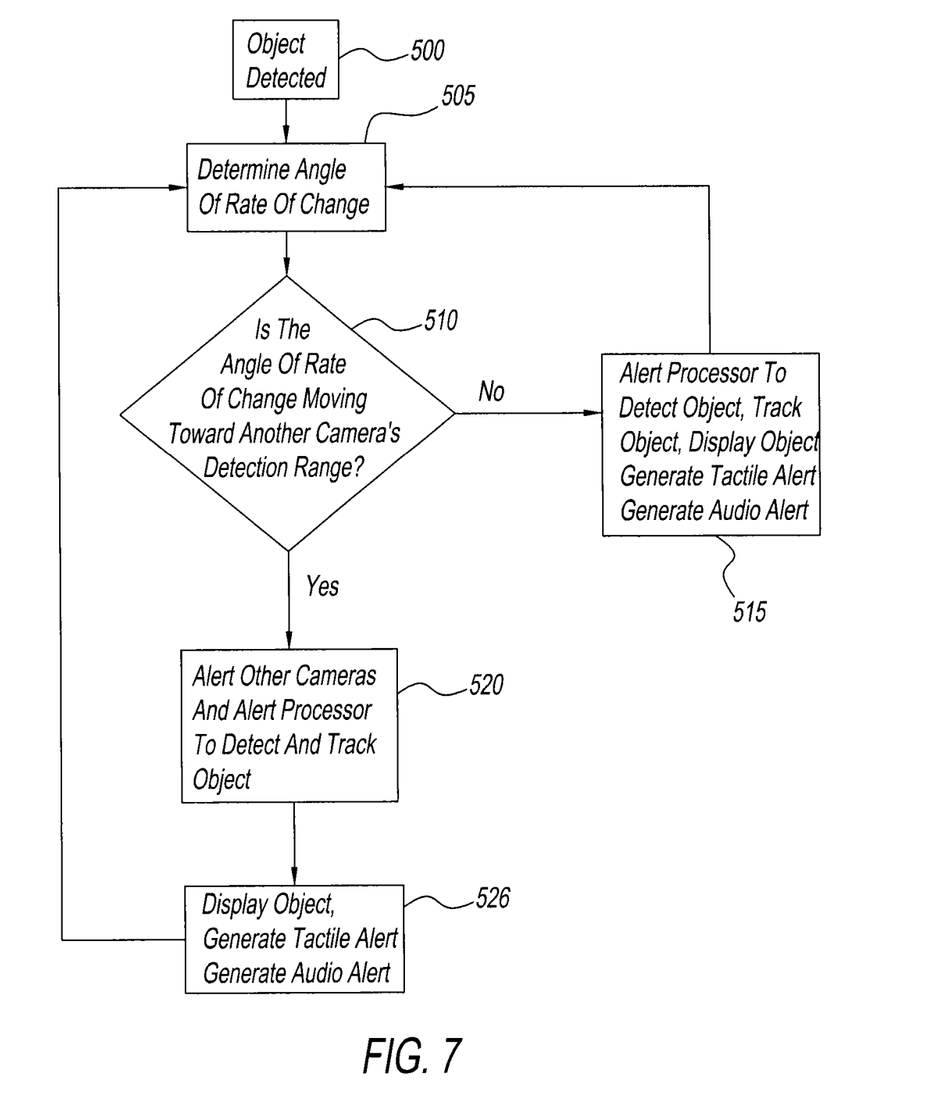
FIG. 7 is a flowchart of a method for generating a tactile warning to a driver in response to detection of a vehicle in a blind spot when the driver is attempting to change lanes.

FIG. 7 is a flow chart of a method for generating a tactile response when an object is detected and the driver's automobile is detected as possibly heading toward a collision with that detected object. The process begins in step 500 where the object is detected and then proceeds to step 505 as previously discussed. Step 510 is similar to that described at FIG. 6 and therefore is not repeated. However, if the response to the query in step 510 is negative, the process proceeds to step 550 where the processor is alerted to detect, track and display the object as well as generate a tactile alert and an audio alert. The processor then returns to step 505. Step 526 is similar to that of FIG. 6, although step 526 includes not only displaying the object, but also generating a tactile alert and generating an audio alert before returning to step S505.

Figure 8:
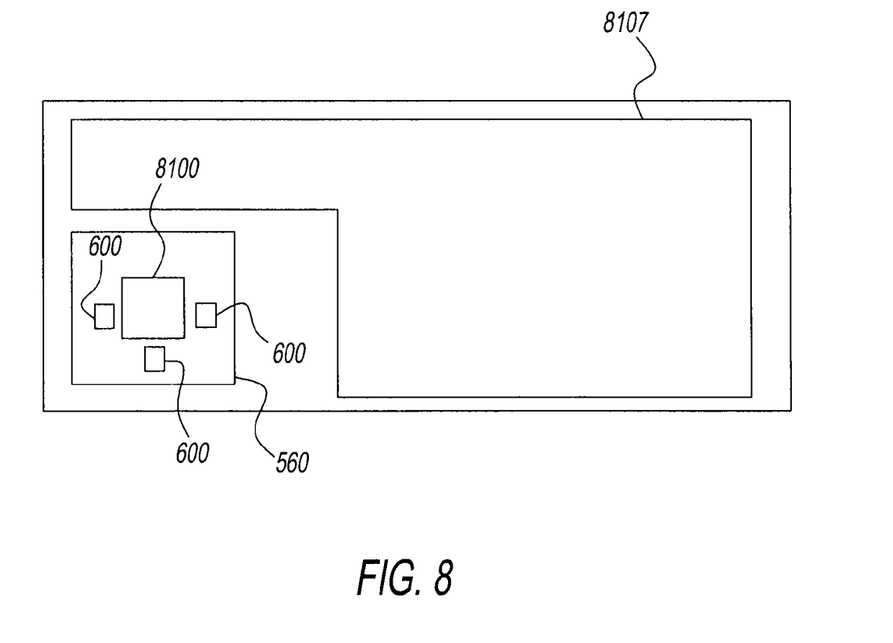
FIG. 8 is an exemplary rear view mirror with an integrated display showing a position of one or more detected vehicles adjacent to the driver's vehicle.

FIG. 8 shows the rear view mirror and display 107 that includes a mirror portion 8107, which is a conventional mirror, and an integrated display 560. As shown on the integrated display 560, a footprint 8100 of the automobile is shown with any detected objects 600, located about the footprint 8100. When presented in this way, a user can easily observe other vehicles located around the driver so as to alert the driver about vehicles in blind spots before the driver chooses to change lanes. If the driver nevertheless attempts to change lanes when an object is detected in the location where the driver's automobile is anticipated to head, an alert (visual, tactile or audio) is generated to warn the user to avoid a collision.

Figure 9:
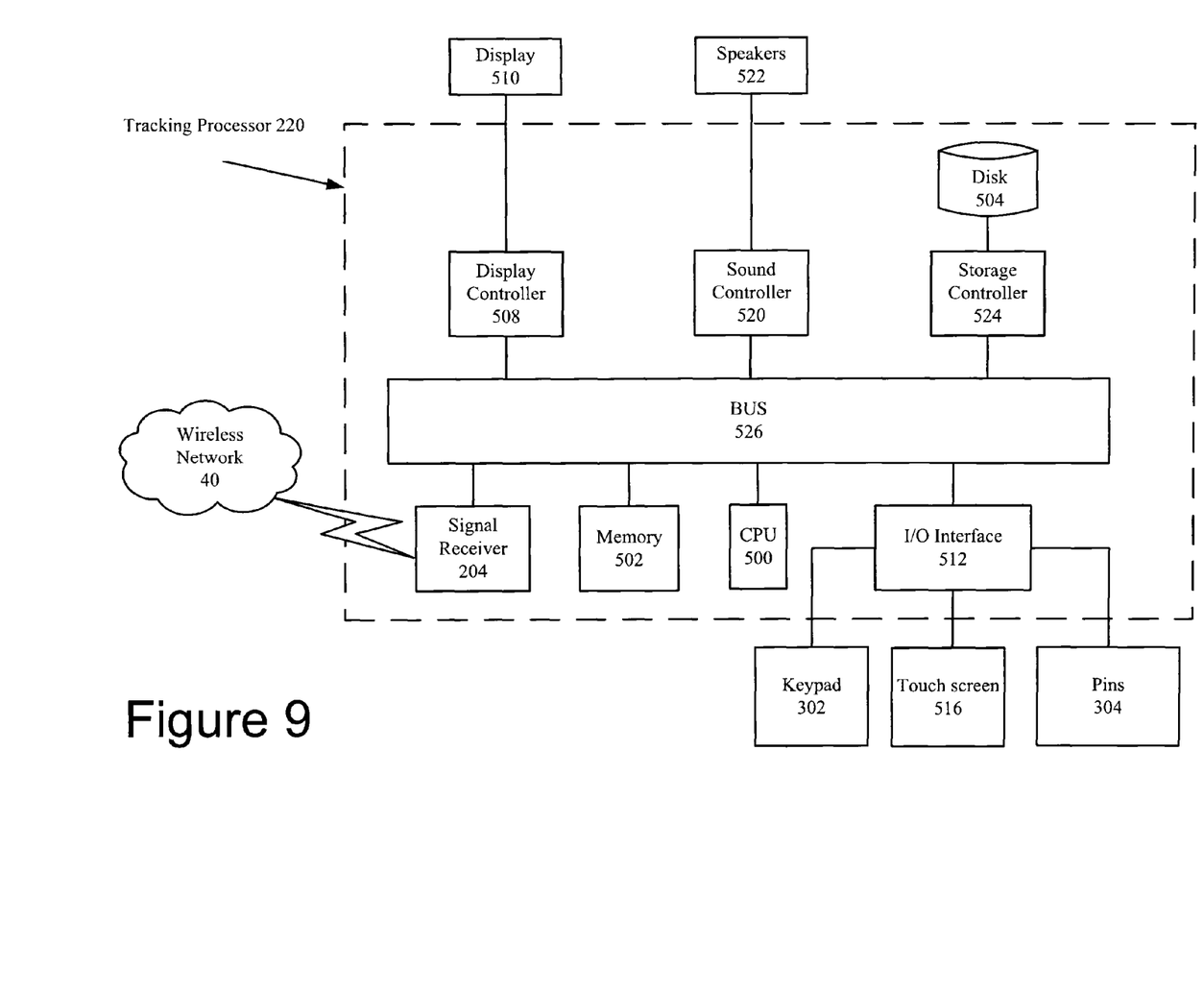
FIG. 9 is a block diagram of components used to implement the system to minimize hazards of blind spots while driving according to an embodiment.

Next, a hardware description of the tracking processor 220 according to exemplary embodiments is described with reference to FIG. 9. In FIG. 9, a CPU 500 which performs the processes described above. The process data and instructions may be stored in memory 502. These processes and instructions may also be stored on a storage medium disk 504 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device.

Further, the claimed advancements may be provided as a utility application, background daemon, or component of an operating system, or combination thereof, executing in conjunction with CPU 500 and an operating system such as Microsoft Windows 7, UNIX, Solaris, LINUX, Apple MAC-OS and other systems known to those skilled in the art.

CPU 500 may be a Xenon or Core processor from Intel of America or an Opteron processor from AMD of America, or may be other processor types that would be recognized by one of ordinary skill in the art. Alternatively, the CPU 500 may be implemented on an FPGA, ASIC, PLD or using discrete logic circuits, as one of ordinary skill in the art would recognize. Further, CPU 500 may be implemented as multiple processors cooperatively working in parallel to perform the instructions of the inventive processes described above.

FIG. 9 also includes a signal receiver 204, such as an Intel Ethernet PRO network interface card from Intel Corporation of America, for interfacing with wireless network 40. As can be appreciated, the wireless network 40 can be a public network, such as the Internet, or a private network such as an LAN or WAN network, or any combination thereof and can also include PSTN or ISDN sub-networks. The wireless network 40 can also be wired, such as an Ethernet network, or can be wireless such as a cellular network including EDGE, 3G and 4G wireless cellular systems. The wireless network can also be WiFi, Bluetooth, or any other wireless form of communication that is known.

The processor 220 further includes a display controller 508, such as a NVIDIA GeForce GTX or Quadro graphics adaptor from NVIDIA Corporation of America for interfacing with display 510, such as a Hewlett Packard HPL2445w LCD monitor. A general purpose I/O interface 512 interfaces with a keypad 302 as well as a touch screen panel 516 on or separate from display 510. General purpose I/O interface also connects to a plurality of pins 304.

A sound controller 520 is also provided in the tactile communication apparatus 1, such as Sound Blaster X-Fi Titanium from Creative, to interface with speakers/microphone 522 thereby providing sounds and/or music. The speakers/microphone 522 can also be used to accept dictated words as commands for controlling the tactile communication apparatus 1 or for providing location and/or property information with respect to the target property.

The general purpose storage controller 524 connects the storage medium disk 504 with communication bus 526, which may be an ISA, EISA, VESA, PCI, or similar, for interconnecting all of the components of the tactile communication apparatus 1. A description of the general features and functionality of the display 510, as well as the display controller 508, storage controller 524, network controller 506, and sound controller 520 is omitted herein for brevity as these features are known.

Obviously, numerous modifications and variations of the present invention are possible in light of the above teachings. It is therefore to be understood that within the scope of the appended claims, the invention may be practiced otherwise than as specifically described herein.

The invention claimed is:

1. A blind-spot detection and collision avoidance system for an automobile comprising:
a blind-spot camera integrated into a side-view mirror assembly between a side-view mirror and a driver-side of the automobile adjacent to a driver-side window, said blind-spot camera being oriented by greater than 180° relative to said side-view mirror so as to provide a different visual operating range than said side view mirror;
a rear view mirror assembly that includes a mirrored portion and a display portion, said display portion configured to present a visual representation of an object detected in a blind spot covered by the visual operating range of the blind-spot camera;
a tracking processor that receives an image captured by the blind-spot camera, said tracking processor including
an object detector configured to detect the object when the object is positioned within a field of view of the blind-spot camera and within a predetermined range from the blind-spot camera, and
a display processor that sends a display signal to the display portion of the rear view mirror assembly in response to the object detector determining that the object is detected to be in the blind spot; and
a rear camera disposed on a back side of said automobile and having a field of view that is directed behind the automobile, said rear camera configured to generate a rear-looking image that is provided to the object detector, wherein said tracking processor receives the rear-looking image and said object detector determines whether the object is detected behind the automobile, and
said display processor includes in the display signal an indication that another object is located behind the automobile so as to be visually presented on the display portion,
said object detector is responsive to an external signal indicating that the automobile is preparing to change driving lanes,
the tracking processor includes an angle rate of change processor that monitors a rate of change of the another object as the another object moves through the field of view of the rear camera and triggers a process to observe said another object in the image of the side tracking camera, and the angle rate of change processor generates an alert signal when an observed rate of change is at least 10° per second.

2. The system of claim 1, wherein
the display portion of the rear view mirror assembly includes a footprint of the automobile, and the display processor includes location information in the display signal so the display portion can display the representation of the object at a position around the footprint as a visual indication of where the object is positioned with respect to the automobile.

3. The system of claim 1, further comprising:
a turn signal detector that generates the external signal when activated so as to place the object detector in an active mode.

4. The system of claim 1, further comprising:
a head movement detector that detects a movement of a head of a driver and generates the external signal when the head is detected as being in a predetermined position so as to place the object detector in an active mode.

5. The system of claim 1, further comprising:
an eye movement detector that detects an eye movement of a driver and generates the external signal when the eye movement is detected as being at least a predetermined amount so as to place the object detector in an active mode.

6. The system of claim 1, further comprising:
a tactile transducer that receives a signal from the tracking processor when the object detector is in an active mode and detects the object, said tactile transducer being attached to at least one of a steering wheel of the automobile and a driver seat of the automobile as a tactile warning of a possible collision if the automobile continues to change driving lanes.

7. The system of claim 1, further comprising:
an audio alert mechanism that receives a signal from the tracking processor when the object detector is in an active mode and detects the object, said audio alert mechanism generates an audible signal as a warning of a possible collision if the automobile continues to change driving lanes.

8. The system of claim 1, further comprising:
a side tracking camera that has a field of view oriented perpendicular to a driver side of the automobile, wherein
said tracking processor receives an image captured by the side view camera,
said object detector determines whether the object is detected in the blind spot by analyzing the image from the blind-spot camera and the side-tracking camera.

9. The system of claim 8, wherein
the object detector detects the object as being in the blind-spot when the object occupies at least one of 25% to 100% of the field of view of the blind-spot camera, 30% to 100% of the field of view of the side tracking camera, and 45% to 100% of a combined field of view of the blind-spot camera and the side tracking camera.

10. The system of claim 1, further comprising:
a passenger blind spot camera and a passenger tracking camera that respectively provide images to the object detector.

11. The system of claim 1, wherein the display portion of the rear view mirror assembly is not a mirrored surface, and is disposed at a side of a mirrored surface portion of the rear view mirror assembly.

* * * * *